Jan. 7, 1947.  A. ROBERTSON  2,413,927
BULKHEAD CLIP
Filed May 2, 1944
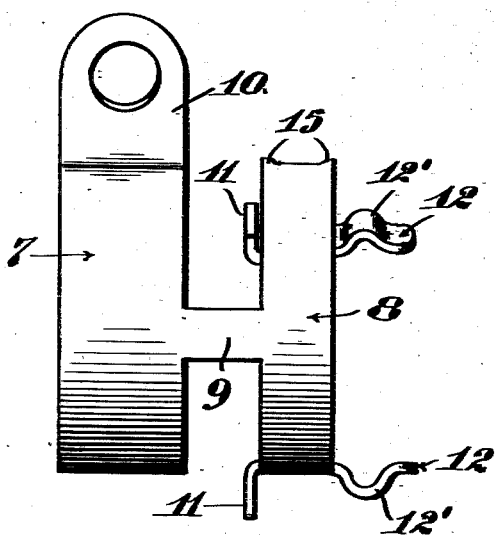
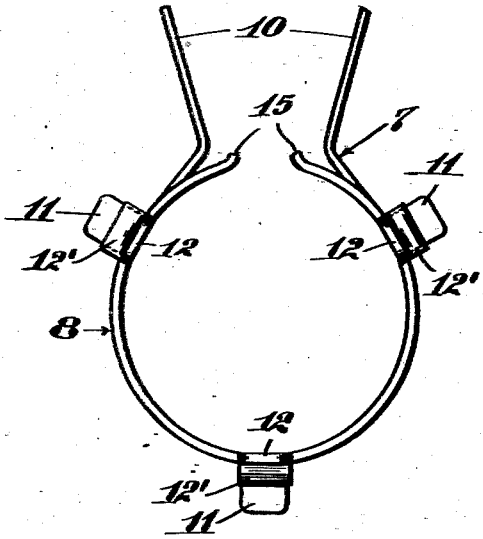
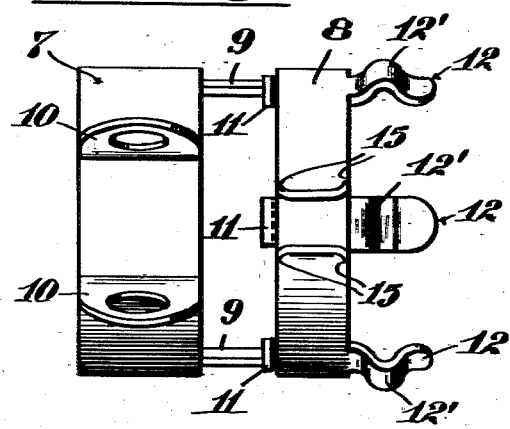
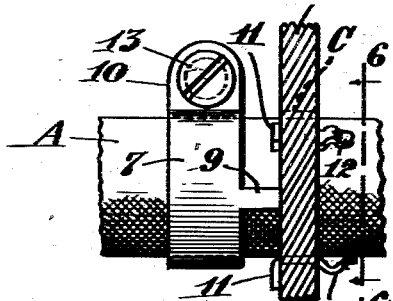
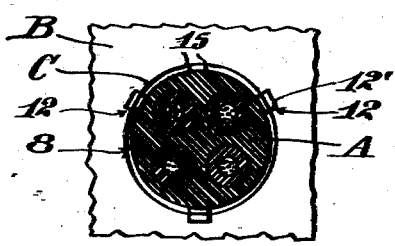
Inventor
Archibald Robertson
By R. S. Berry
Attorney Patented Jan. 7, 1947

2,413,927

UNITED STATES PATENT OFFICE 2,413,927

BULKHEAD CLIP

Archibald Robertson, Hollywood, Calif., assignor to Adel Precision Products Corp., a corporation of California Application May 2, 1944, Serial No. 533,770

7 Claims. (Cl. 248—56)

This invention relates to clips of the type shown in my copending application for United States Letters Patent, Serial Number 502,339, filed September 14, 1943, which has since matured into Patent No. 2,362,160, issued November 7, 1944, wherein such clips are employed to support and secure to bulkheads in surface ships, aircraft and the like, the wires, conduits and like lines which are passed through openings in the bulkheads, whereby derangement, excessive vibration, wear, and damage to such lines are prevented.

An object of the present invention is to provide a clip of the character described which has all of the advantages of the clip shown in my pending application hereinbefore identified, and embodies certain improvements thereover in point of being lighter as to weight, requiring less metal, more simple as to construction, cheaper to manufacture, and subject to easier and quicker installation.

Another object of my invention is to provide a clip such as described in which novel spring latch tongues make possible a quick and easy fastening of the clip in the opening of a bulkhead through which opening the wires, conduit or other lines are passed.

A further object is to provide in a clip such as described a split resilient band which is joined by simple connecting webs to the main clamping loop or band and affords an effective spring action for latch tongues carried thereby whereby said tongues in being passed through a bulkhead opening will snap into position for effectively yet detachably holding the clip as a whole on the bulkhead with the main clamp subject to being readily clamped on the line or wires supported by the clip, it being possible to clamp the clip on the conduit before or after the mounting of the clip on the bulkhead.

Another object is to provide a clip such as described which makes possible a most expeditious and labor saving installation thereof on the bulkhead, in that the clip may first be clamped on the line or wires whereby on pulling the lines or wires through the bulkhead opening the clip will enter said opening and be snapped into locked position thereof, due to the construction and arrangement of the novel locking or latching tongues and their associated parts.

With the foregoing objects in view together with such other objects and advantages as may subsequently appear, the invention is carried into effect as illustrated by way of example in the accompanying drawing in which:

Fig. 1 is a side elevation of a clip embodying my invention;

Fig. 2 is an end elevation looking towards the left end in Fig. 1;

Fig. 3 is a top plan view of the clip;

Fig. 4 is a side elevation of the clip as installed;

Fig. 5 is a top plan view of the clip as installed;

Fig. 6 is a sectional view taken on the line 6—6 of Fig. 4.

As shown in the accompanying drawing one embodiment of the present invention comprises a clip made in one piece from a blank of suitable resilient sheet metal so as to provide a main and open or split clamping loop or band 7 a narrower and similarly split attaching loop or band 8 axially spaced from and aligned with loop 7; one or more small connecting webs 9 joining said loops or bands; opposed outwardly extending apertured ears 10 on the ends of the loop 7; integral stop members or lugs 11 struck out from the band 8; and integral spring latching or locking tongues 12 projecting outwardly from the band 8.

The clamping band on loop 7 is adapted to be clamped around a conduit or bundle or wires A as shown in Figs. 4 and 5, by means of a bolt 13 and nut 14, so that the conduit or bundle or wires passing through an opening B in a bulkhead C and the clips as a whole may be securely anchored to the bulkhead by means of the band 8 lugs 11 and latching tongues 12, for as here shown the tongues 12 extend generally axially of the band 8 and have outward bends intermediate their ends forming humps or shoulders 12' to prevent accidental dislodgment or withdrawal of the clip from the bulkhead.

To attach or anchor the clip to the bulkhead either before or after the clamp 7 is tightened or clamped on the wires, the clip is moved to insert the attaching band 8 into the bulkhead opening B during which movement the tongues 12 will extend into the opening and cause the band 8 to be somewhat constricted while the humps or shoulders 12' pass through the opening. When the humps or shoulders have passed through the opening B, the tongues with a snap action move the humps 12 against one side of the bulkhead around the opening, while the stop lugs 11 are engaged with the other side of the bulkhead. The tongues are relatively stiff due to the bends forming the humps 12' and the snap or opening action is primarily provided by the split band 8. However, the tongues are of themselves somewhat resilient and will yield on being passed through the opening B, thus giving a double spring action to the tongues. Moreover the band 8 in being within the opening will expand when the humps 12' have passed through the opening and grip the wall of the opening and provide an added holding action for the clip.

One of the advantages of this clip is that after it is clamped on the conduit A or bundle of wires or other line it will automatically be latched and secured to the bulkhead upon pulling the conduit wires or the like through the opening inasmuch as the tongues will be guided by the conduit so as to enter the opening in the bulkhead and constrict the band 8 so that it too will enter said opening and both the tongues and band 8 will expand into holding position, once the humps 12' are moved through the opening. The stop lugs 11 limit the insertion movement of the tongues 12 and band 8 relative to the opening B, and cooperate with the humps 12' to prevent unintentional dislodgment of the clip from the bulkhead.

If desired, instead of first attaching the conduit as above stated, the clip may first be inserted into the bulkhead or junction box opening and then the conduit inserted through the clip and the latter clamped to the conduit. The encircled conduit will then prevent the humps 12' of the fingers 12 from being compressed sufficiently to allow the clip to be accidentally withdrawn after the conduit has been inserted therein.

The two webs 9 are relatively narrow and so positioned that on clamping the main loop or band 7 on the conduit or wires A, the band 8 will be slightly constricted and this constriction facilitates a ready insertion of the band into the bulkhead opening.

While the clip is securely held in place by the tongues 12 and band 8, it may, when desired, be pulled out of the opening in the bulkhead by applying a strong pulling-out force thereon by hand or with a suitable tool while pressing the tongues 12 inwardly with pliers or the like so that the hump 12' will snap past the edge of the opening B and pass out through said opening.

The band 8 in being constricted in the opening B or the bulkhead together with the web 9 will provide added support and an added clamping action for the conduit or wires A thereby assuring a secure holding of the conduit or wires in such manner as to prevent dislodgment, wear and consequent damage thereof.

If it is desired to mount the clip in the bulkhead opening before being clamped on the conduit or wires the operator may with his fingers or suitable tool force the ears 10 together or otherwise constrict the band 8 sufficiently to permit it and the tongues 12 to enter the opening. This is more readily accomplished because of the webs 9 joining the clamping loop to the retaining loop 8 at points which are spaced away from the points where the tongues 12 are located.

It is now apparent that my improved clip embodies a main clamping loop provided with a means extending from one side therefor for securing the clip to a bulkhead which means includes spring latch tongues operating when extended through the bulkhead opening to automatically grip the bulkhead so as to hold the clip in place whereby the advantages hereof are attained in a particularly efficacious manner.

The ends of the band 8 may be bent outwardly to provide small spurs 15 for gripping the wall of the opening in the bulkhead and assisting in the holding of the clip in place.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting a conduit line or wires which pass through an opening in a bulkhead, an open clamping loop adapted to embrace the conduit line or wires at one side of the bulkhead, a split conduit or wire embracing band coaxial with and spaced from said loop adapted to be inserted into the opening in the bulkhead, means joining said band to said loop, stop means limiting the extension of said band into said opening and spring tongues projecting from the band with outbent portions between their ends and arranged so that upon extension thereof through said opening they will spring into contact with the bulkhead so as to hold the clip therein.

2. In a clip for supporting a conduit line or wires which pass through an opening in a bulkhead, an open clamping loop adapted to embrace the conduit line or wires at one side of the bulkhead, and means for securing the clip to the bulkhead projecting from one side of said loop and including spring tongues operating upon being projected through the opening in the bulkhead to grip the bulkhead and hold the clip therein, and stop means cooperating with said tongues to hold the clip in place, each of said tongues having an outbent portion between its ends to perform the aforementioned holding function.

3. In a clip for supporting a conduit line or wires which pass through an opening in a bulkhead, an open clamping loop adapted to embrace the conduit line or wires at one side of the bulkhead, and means for securing the clip to the bulkhead projecting from one side of said loop and including spring tongues operating upon being projected through the opening in the bulkhead to grip the bulkhead and hold the clip therein, said means also including a resilient split band coaxial with the loop and extensible into said opening, each of said tongues having an outbent portion between its ends to perform the aforementioned holding function.

4. In a clip for supporting a conduit line or wires which pass through an opening in a bulkhead, an open clamping loop adapted to embrace the conduit line or wires at one side of the bulkhead, and means for securing the clip to the bulkhead projecting from one side of said loop and including spring tongues operating upon being projected through the opening in the bulkhead to grip the bulkhead and hold the clip therein, said means also including a resilient split band coaxial with the loop and extensible into said opening, said tongues being carried by said band, and webs joining said band to said loop, each of said tongues having an outbent portion between its ends to perform the aforementioned holding function.

5. In a clip for supporting a conduit line or wires which pass through an opening in a bulkhead, an open clamping loop adapted to embrace the conduit line or wires at one side of the bulkhead, and means for securing the clip to the bulkhead projecting from one side of said loop and including spring tongues operating upon being projected through the opening in the bulkhead to grip the bulkhead and hold the clip therein, said means also including a resilient split band coaxial with the loop and extensible into said opening, said tongues being carried by said band, and webs joining said band to said loop, and stop members struck outwardly from said band to abut one side of said bulkhead, each of said tongues having an outbent portion between its ends to perform the aforementioned holding function.

6. In a clip for supporting a conduit line or wires which pass through an opening in a bulkhead, a resilient metal clamping loop having opposed apertured ends providing for the clamping of the lock on a conduit line or wires, preliminary to drawing the wire or conduit through said bulkhead opening, and spring latch means carried by said loop and operating when the wire or conduit is pulled through said opening, to pass through said opening and snap into position gripping the bulkhead to hold the clip therein, said means including a split resilient band insertable into the bulkhead opening, means connecting the band with said loop and maintaining said band and loop in axially spaced relation, stop lugs on the band to engage one side of the bulkhead when the band is mounted in said opening, and spring locking tongues projecting from said band for gripping the other side of said bulkhead when the band is mounted in the bulkhead opening, and bulkhead contacting shoulders intermediate the ends of said tongues, said shoulders being formed by an outwardly directed bend in each of said tongues.

7. In a clip for supporting a conduit line or wires which pass through an opening in a bulkhead, a clamping loop to embrace the conduit line or wires at one side of the bulkhead, webs extending axially from said loop, a securing loop carried by said webs in an axially spaced relation to said clamping loop, said securing loop being split at one side, and being provided with a resilient end portion or arm at each side of the split directed theretoward, each of said arms having a laterally extending edge portion forming a tongue which extends axially of the clip and has an outward bend between its ends which forms a shoulder positioned to prevent accidental withdrawal of the clip from the bulkhead, the aforesaid webs being united to said arms in a spaced relation to said tongues, so that the tongues are supported in a yielding manner, allowing the clip to be sprung into place within the bulkhead opening, and in a position wherein the two tongue-carrying arms abut in a flatwise manner against the edge of the opening in the bulkhead.

ARCHIBALD ROBERTSON.